US009848181B2

(12) United States Patent
Lin

(10) Patent No.: US 9,848,181 B2
(45) Date of Patent: Dec. 19, 2017

(54) HAND-HELD ELECTRONIC APPARATUS, IMAGE CAPTURING APPARATUS AND METHOD FOR OBTAINING DEPTH INFORMATION

(71) Applicant: HTC Corporation, Taoyuan County (TW)

(72) Inventor: Chun-Ta Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 621 days.

(21) Appl. No.: 14/445,076

(22) Filed: Jul. 29, 2014

(65) Prior Publication Data
US 2016/0037151 A1 Feb. 4, 2016

(51) Int. Cl.
*H04N 13/02* (2006.01)
*H04N 13/00* (2006.01)

(52) U.S. Cl.
CPC ..... *H04N 13/0271* (2013.01); *H04N 13/0007* (2013.01); *H04N 13/0253* (2013.01); *H04N 13/0022* (2013.01); *H04N 13/0239* (2013.01); *H04N 2013/0081* (2013.01); *H04N 2213/003* (2013.01); *H04N 2213/005* (2013.01)

(58) Field of Classification Search
CPC ....... H04N 13/0022; H04N 2013/0081; H04N 13/0007; H04N 13/0203; H04N 13/0239; H04N 13/0253; H04N 13/0271; H04N 2213/003; H04N 2213/005
See application file for complete search history.

(56) References Cited

U.S. PATENT DOCUMENTS

| 2012/0039525 | A1* | 2/2012 | Tian | ........................ G06T 5/005 382/154 |
| 2013/0057655 | A1 | 3/2013 | Su et al. | |
| 2013/0308013 | A1* | 11/2013 | Li | ........................... G01S 17/89 348/231.3 |

FOREIGN PATENT DOCUMENTS

CN 101873416 10/2010
TW 201312249 3/2013
(Continued)

OTHER PUBLICATIONS

Zhang et al: "High quality depth maps from stereo matching and ToF camera," Soft Computing and Pattern Recognition (SoCPaR), 2011 International Conference; vol., No., pp. 68-72, Oct. 14-16, 2011.*

(Continued)

*Primary Examiner* — Andy Rao
*Assistant Examiner* — Tyler Edwards
(74) *Attorney, Agent, or Firm* — JCIPRNET

(57) ABSTRACT

A hand-held electronic apparatus, an image capturing apparatus and a method for obtaining depth information are provided. The image capturing apparatus includes a time of fly (TOF) image capturer, a TOF controller, a main and sub image capturers, and a controller. The TOF image capturer calculates a TOF depth map according to a TOF image, defines an effective region and an un-effective region according to the TOF depth map, and obtains a first depth information set of the effective region. The main and sub image capturers captures a first and second images, respectively. The controller obtains a second depth information set of the un-effectively region by comparing the first and second images, and generates an overall depth map by combining the first depth information set and the second depth information set.

28 Claims, 6 Drawing Sheets

(56) References Cited

FOREIGN PATENT DOCUMENTS

TW            M458748         8/2013
TW            201350954       12/2013

OTHER PUBLICATIONS

Gudmundsson et al—Fusion of Stereo Vision and Time-of-Flight Imaging for Improved 3D Estimation—Int. J. Intelligent Systems Technologies and Applications, Jan. 1, 2008, pp. 1-8.*
Fischer et al: "Combination of time-of-flight depth and stereo using semi global optimization"; Robotics and Automation (ICRA), 2011 IEEE International Conference on May 9-13, 2011; pp. 1-6.*
Zhang et al., "High quality depth maps from stereo matching and ToF camera," Soft Computing and Pattern Recognition (SoCPaR), 2011 International Conference; vol., No., pp. 68-72, Oct. 14-16, 2011.*
"Office Action of Taiwan Counterpart Application," dated Jul. 30, 2015, p. 1-p. 12.
Zhu Jiang et al.,"Research on Far distance filter for SR-3000 camera",Jan. 19, 2012, available at: www.paper.edu.cn/download/downPaper/201201-735, pp. 1-5.
"Office Action of China Counterpart Application," dated Jul. 18, 2017, p. 1-p. 9.

* cited by examiner

HAND-HELD ELECTRONIC APPARATUS, IMAGE CAPTURING APPARATUS AND METHOD FOR OBTAINING DEPTH INFORMATION

BACKGROUND OF THE INVENTION

Field of the Invention

The invention relates to an image capturer. More particularly, the invention relates to a method for the image capturer to obtain depth information.

Description of Related Art

With advances in electronic technology, consumer electronic products have gained popularity. Among these products, hand-held electronic apparatuses, in particular, have become a mainstream in recent years. Besides, it is also one of important trends to provide a high-quality image capturing function adopted in a hand-held electronic apparatus.

Depth Calculations of image objects are very important in terms of capturing high-quality images. In the conventional art, a hand-held electronic apparatus is provided with a plurality of image capturers, and image shifting could be obtained by different image capturers for calculating depth information. With this approach, when an object distance from an object to an image capturer is too short, excessive image shifting may easily result in greater errors in depth information which is obtained by calculations. In addition, with the above conventional approach, if an image includes objects having a flat surface, or without obvious lines (e.g., objects such as gray walls and white papers), calculations for depth information of these objects would not be accurate.

Accordingly, it is a main task for designers in the art to provide a method for completely and accurately calculating image depth information.

SUMMARY OF THE INVENTION

The invention provides an image capturing apparatus and a method for obtaining depth information, which may obtain a more complete and accurate depth map information.

The invention further provides a hand-held electronic apparatus, in which an image capturing apparatus may obtain a more complete and accurate depth map information.

An image capturing apparatus of the invention includes a time of fly (TOF) image capturer, a TOF controller, a main image capturer, a sub image capturer, and a controller. The time of fly (TOF) image capturer is configured for executing an image capturing action and outputting a TOF image. The TOF controller is coupled to the TOF image capturer and calculating a TOF depth map according to the TOF image, defining an effective region and an un-effective region according to the TOF depth map, and capturing a first depth information set corresponding to the effective region from the TOF image. The main image capturer is configured for executing an image capturing action and obtaining a first image. The sub image capturer is configured for executing an image capturing action and obtaining a second image. The controller is coupled to the TOF image capturer and the main image capturer, and is configured for comparing images of the first image and the second image in an un-effectively region, so as to obtain a second depth information set corresponding to the un-effectively region, and for obtaining an overall depth map by combining the first depth information set and the second depth information set.

An image capturing apparatus of the invention includes a time of fly (TOF) image capturer, a TOF controller, a main image capturer, and a controller. The TOF image capturer is configured for executing an image capturing action and outputting a TOF image. The TOF controller is coupled to the TOF image capturer and calculates a TOF depth map according to the TOF image, defines an effective region and an un-effective region according to the TOF depth map, and captures a first depth information set corresponding to the effective region from the TOF image. The main image capturer is configured for executing an image capturing action and obtaining a first image. The controller is coupled to the TOF image capturer and the main image capturer, and is configured for comparing images of the first image and the TOF image in an un-effective region, so as to obtain a second depth information set corresponding to the un-effective region and generate an overall depth map by combining the first depth information set and the second depth information set.

A hand-held electronic apparatus of the invention includes a mainframe and an image capturing apparatus. The image capturing apparatus includes a time of fly (TOF) image capturer, a TOF controller, a main image capture, a sub image capturer, and a controller. The time of fly (TOF) image capturer is configured for executing an image capturing action and outputting a TOF image. The sub image capturer is configured for executing an image capturing action and obtaining a second image. The controller is coupled to the TOF image capturer and the main image capturer, and is configured for comparing images of the first image and the second image in an un-effective region, so as to obtain a second depth information set corresponding to the un-effective region, and for generating an overall depth map by combining the first depth information set and the second depth information set.

In the invention, a method for obtaining depth information includes: capturing respectively a TOF image, a first image, and a second image by a TOF image capturer, a main image capturer, and a sub image capturer, respectively; obtaining an effective region and an un-effective region of the TOF image and generating a first depth information set of the effective region; calculating a second depth information set of a region image of the un-effective region according to two of the TOF image, the first and second images; and generating an overall depth map according to the first depth information set and the second information set.

In light of the above, calculations of depth information in the invention are executed by coordinating a TOF image capturer and an image capturer. Objects having short-range and medium-range object distances in an image may be calculated by the TOF image capturer, and objects having further-range object distances may be calculated according to images captured by the TOF image capturer and the image capturer. Accordingly, objects having different distances in the images may be obtained respectively according to preferred calculation methods. Therefore, a more complete and accurate depth map may be obtained.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
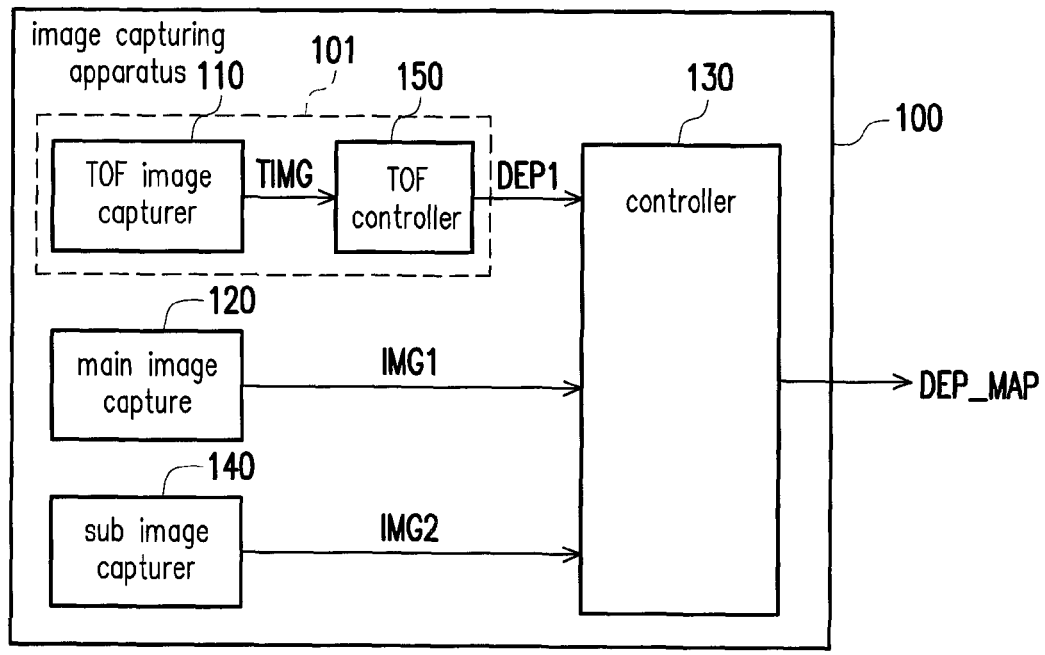
FIG. 1A is a schematic view illustrating an image capturer of an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

With reference to FIG. 1A, FIG. 1A is a schematic view illustrating an image capturer of an embodiment of the invention. In FIG. 1A, an image capturing apparatus 100 includes a time of fly (TOF) image capturer 110, a main image capturer 120, a sub image capturer 140, a TOF controller 150, and a controller 130. The TOF image capturer 110 is configured for executing an image capturing action (e.g., taking photos) to obtain and output a TOF image TIME The TOF controller 150 determines the TOF image TIMG so as to obtain a TOF depth map. The TOF controller 150 defines an effective region and an un-effective region of the TOF image TIMG according to the TOF depth map. In addition, the TOF controller 150 may calculate a first depth information set DEP1 of the effective region of the TOF image TIMG.

In the present embodiment, the TOF image capturer 110 and the TOF controller 150 may be integrated in an integrated circuit (IC) 101.

Here, the TOF image capturer 110 may calculate an object distance from an object to the TOF image capturer 110 by transmitting an electromagnetic wave signal to the object and receiving a reflective electromagnetic wave signal which is reflected by the object. The electromagnetic wave signal may be a signal of invisible light, such as infrared light. Accordingly, when the object distance from the object to the TOF image capturer 110 is too long, an error value of the object distance which is detected by the TOF image capturer 110 may be too big. Therefore, the TOF image capturer 110 may set the object having a very long object distance in the TOF image TIMG as an object of the un-effective region, and set the object having an object distance which is shorter than a specific range in the TOF image TIMG as an object of the effective region.

More specifically, the TOF controller 150 may determine object distances from a plurality of objects in the TOF image TIMG and the TOF image capturer 110, and determine whether each object belongs to the effective region or the un-effective region according to whether each object distance of each of the objects is longer than a threshold value. In other words, when an object distance of an object in the TOF image TIMG is longer than a preset threshold value, the object belongs to the un-effective region. Relatively, when an object distance of an object in the TOF image TIMG is not longer than a preset threshold value, the object belongs to the effective region. In the embodiment of the invention, the preset value may be set as one meter.

The main image capturer 120 is configured for capturing an image IMG1, and the sub image capturer 140 is configured for capturing an image IMG2. In addition, the image IMG1, the image IMG2, and the first depth information set DEP1 of the effective region which is obtained by the TOF controller 150 may all be transmitted to the controller 130. The controller 130 may calculate a second depth information set of the un-effectively region in the TOF image TIMG according to the images IMG1 and IMG2, and integrate the first depth information set DEP1 of the effective region with the second depth information set of the un-effective region so as to generate an overall depth map DEP_MAP.

In other words, in the embodiment of the invention, the first depth information set (i.e., depth information of the effective region) of an object having object distances of a short range and a medium range is set up by using, and the second depth information set (i.e., depth information of the un-effective region) of an object having object distances of a medium-long range, long range, and an infinite long range is calculated by using the images IMG1 and IMG2. As such, depth information of all of the objects in the images may be accurately calculated, respectively, and thereby the complete and accurate overall depth map DEP_MAP may be obtained.

Figure 1B:
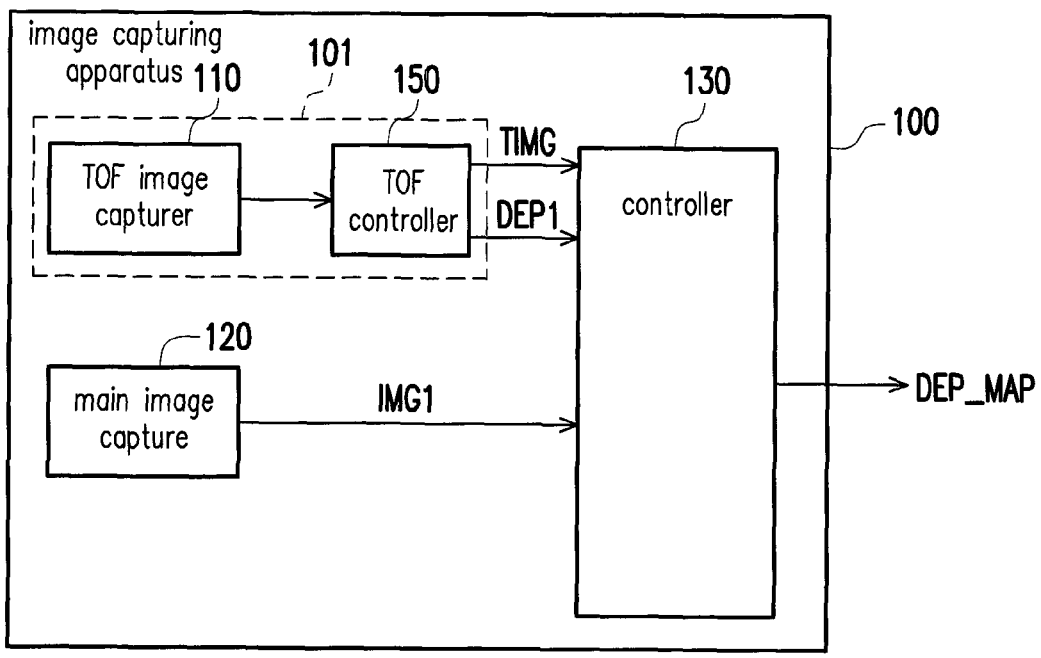
FIG. 1B is a schematic view illustrating an image capturing apparatus 100 in another implementation of an embodiment of the invention.

With reference to FIG. 1B, FIG. 1B is a schematic view illustrating the image capturing apparatus 100 in another implementation of another embodiment of the invention. In FIG. 1B, the image capturing apparatus 100 includes the TOF image capturer 110, the main image capturer 120, the TOF controller 150, and a controller 130. In an embodiment illustrated in FIG. 1B, the controller 130 calculates the second depth information set by coordinating the obtained TOF image TIMG according to the TOF image capturer 110 and the TOF controller 150 with the image IMG1 obtained from the main image capturer 120. In addition, the controller may generate the overall depth map DEP_MAP by synthesizing the first depth information set DEP1 which is obtained according to the TOF controller 150 and the second depth information set.

Figure 2:
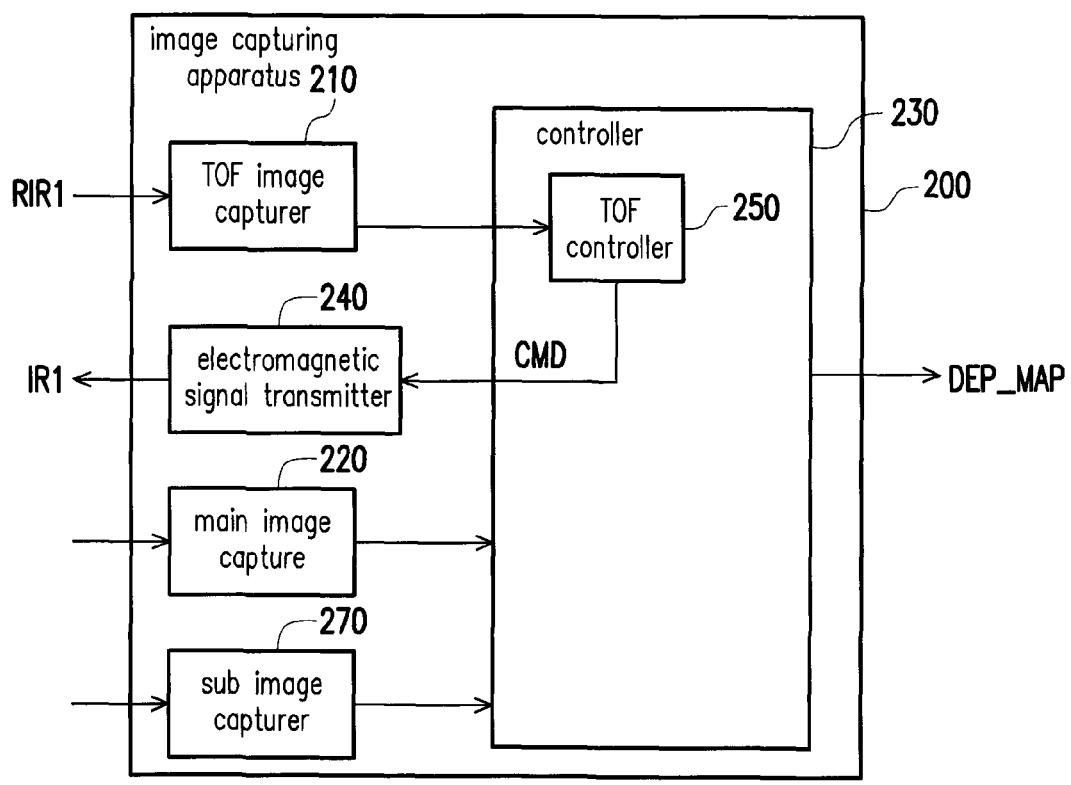
FIG. 2 is a schematic view illustrating an image capturer of another embodiment of the invention.

With reference to FIG. 2, FIG. 2 is a schematic view illustrating an image capturer of another embodiment of the invention. In FIG. 2, an image capturing apparatus 200 includes a TOF image capturer 210, a main image capturer 220, a sub image capture 270, a controller 230, a TOF controller 250, and an electromagnetic signal transmitter 240. In the present embodiment, the electromagnetic signal transmitter 240 is coupled to the TOF controller 250, and is controlled by a transmission command CMD transmitted by the TOF controller 250. In particularly, when the TOF image capturer 210 executes an image capturing action, the TOF controller 250 drives the electromagnetic signal transmitter 240 to transmit an electromagnetic wave signal IR1 by transmitting the transmission command CMD. Further, after the electromagnetic wave signal IR1 touches an object, a generated reflective electromagnetic wave signal RIR1 is received by the TOF image capturer 210. The TOF image controller 250 may calculate a time of flying of the electromagnetic wave signal IR1 and the reflective electromagnetic wave signal RIR1 by a time difference of a transmission time of the electromagnetic wave signal IR1 and a receiving time of the reflective electromagnetic wave signal RIR1, and thereby calculating an object distance from the object to the TOF image capturer 210.

Figure 4:
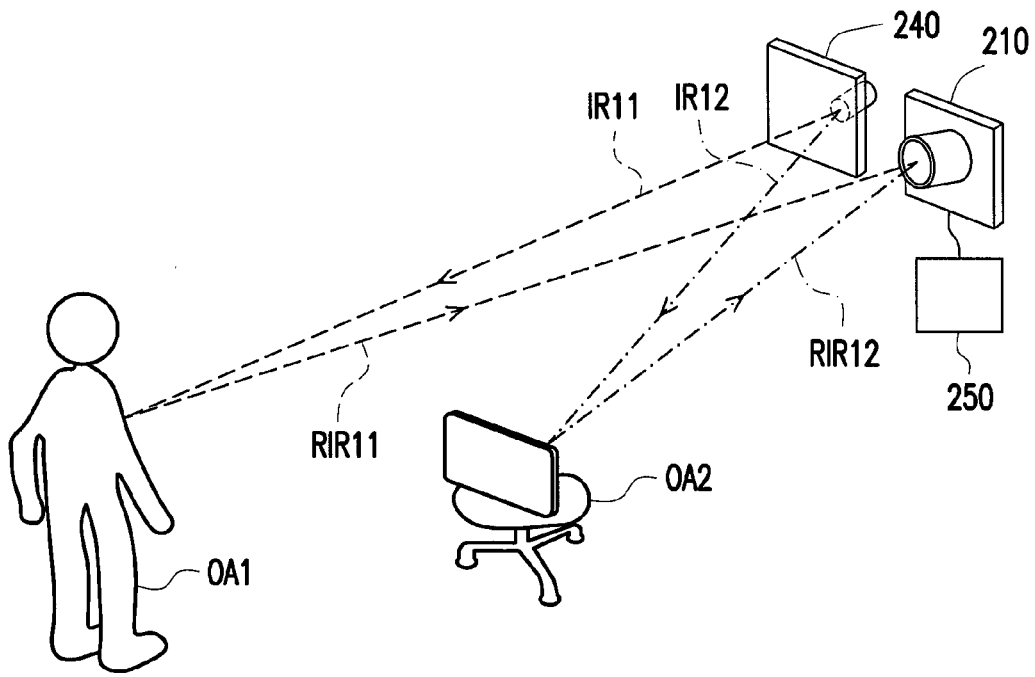
FIG. 4 is a schematic view illustrating actions of a time of fly (TOF) image capturer.

Here, the electromagnetic wave signal IR1 is transmitted to a region, and a plurality of objects in the region may form mediums to generate the reflective electromagnetic wave signal RIR1. The TOF controller 250 establishes the TOF image TIMG according to the reflective electromagnetic wave signal RIR1. Here, with reference to FIG. 4, FIG. 4 is a schematic view illustrating actions of the TOF image capturer 210 and the TOF controller 250. In FIG. 4, the electromagnetic signal transmitter 240 transmits a plurality of electromagnetic wave signals IR11 and IR12 in a specific range. A personnel OA1 and a chair OA2 respectively receive the electromagnetic wave signals IR11 and IR12, and respectively reflect reflective electromagnetic wave signals RIR11 and RIR12. The TOF image capturer 210 may receive the reflective electromagnetic wave signals RIR11 and RIR12, and the TOF controller 250 calculates the TOF image TIMG by calculating object distances from the personnel OA1 and the chair OA2 to the TOF image capturer 210. It should also be mentioned that ranges of the reflective electromagnetic wave signals which are received by the TOF image capturer 210 are fields of view (FOV) of the TOF image capturer 210.

Figure 3A:
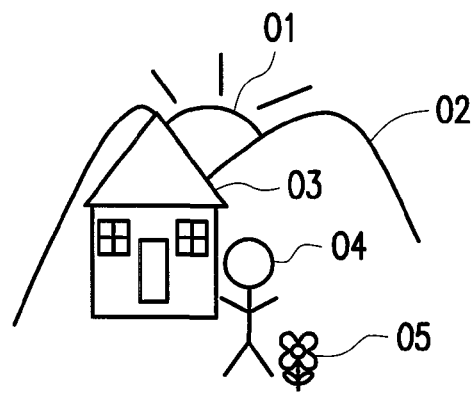
FIG. 3A to FIG. 3C are schematic views illustrating an image region of an embodiment of the invention.

In addition, the TOF controller 250 may define the effective region and the un-effective region of the TOF image TIMG according to the calculated object distance of the object. With reference to FIG. 2 and FIG. 3A to FIG. 3C, FIG. 3A to FIG. 3C are schematic views illustrating an image region of an embodiment of the invention. In FIG. 3A, an image which is captured by the TOF image capturer 210 includes a plurality of objects, such as sun O1, mountains O2, a house O3, a personnel O4, and a floret O5. Sun O1 and the mountains O2 have further object distances, while the house O3, the personnel O4, and a floret O5 have closer object distances.

Figure 3B:
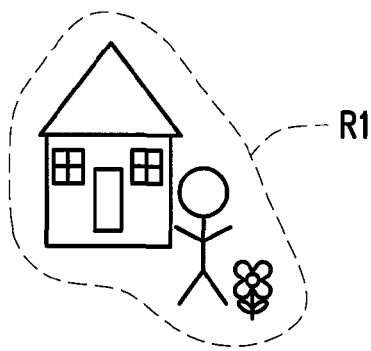
Figure 3C:
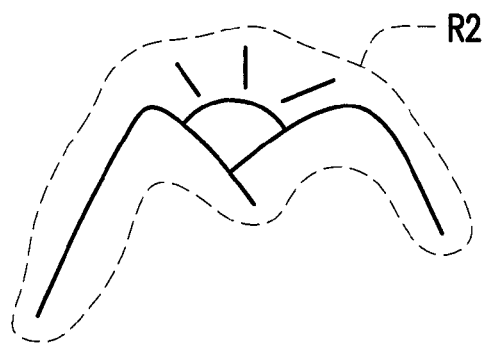

The TOF image capturer 210 may map out according to each object distance of each of the objects, wherein the house O3, the personnel O4, and the floret O5 are mapping out to an effective region R1 (as shown in FIG. 3B), while sun O1 and the mountains O2 are mapping out to an un-effective region R2 (as shown in FIG. 3C).

It should also be mentioned that an image quality of the object in the un-effective region R2 may look vague when the object is presented in the image IMG1.

Figure 5:
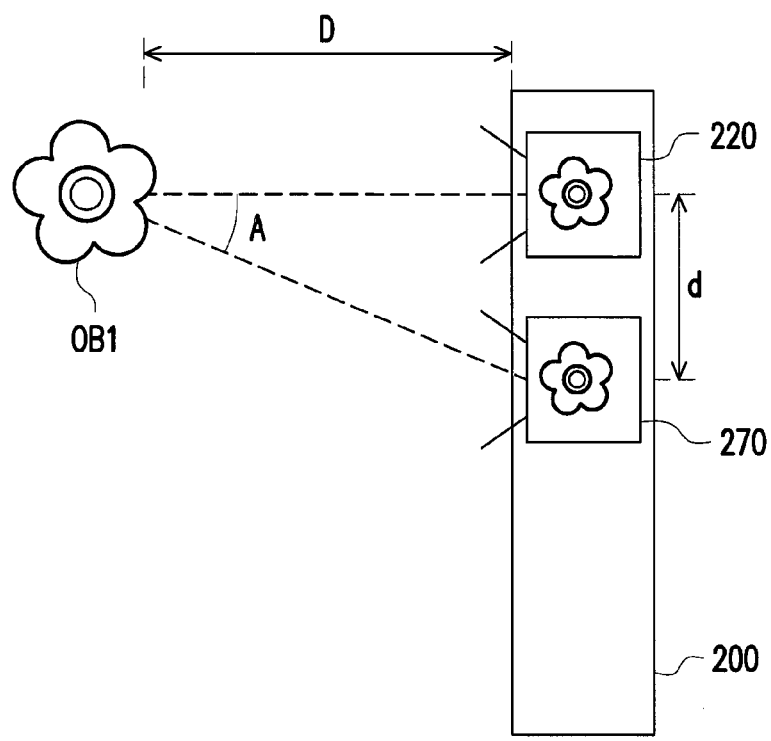
FIG. 5 is a schematic view illustrating depth information calculations.

With reference to FIG. 2 again, the part that the controller 230 calculates depth information of the un-effective region according to the image IMG1 and IMG2 could be referred to FIG. 2 and FIG. 5 at the same time, wherein FIG. 5 is a schematic view illustration depth information calculations. In FIG. 5, the main image capturer 220 and a sub image capturer 270 are disposed on the image capturing apparatus 200. A distance from the main image capturer 220 and the sub image capturer 270 is d, and respectively execute actions for capturing images of an object OB1. In addition, a distance from the image capturing apparatus 200 and the object OB1 is D, and a view angle difference generated between the image capturing apparatus 200 and the object OB1 is A. Accordingly, a depth information DEPTH of the object OB1 is represented by the following equation:

$$\text{DEPTH} = \frac{d}{2 \times D \times \tan\frac{A}{2}} \times 100\%$$

Additionally, on the basis that the images IMG1 and IMG2 provided respectively by the main and sub image capturers 220 and 270 are adopted for calculating depth information of the un-effective region, the main and sub image capturers 220 and 270 may be set to focus on a longer-ranged focal length. The focal length may be longer than a preset threshold value adopted for determining if the object in the image is in the effective region or the un-effective region.

It should also be mentioned that the TOF controller 250 in the embodiment illustrated in FIG. 2 is built in the controller 230.

Figure 6:
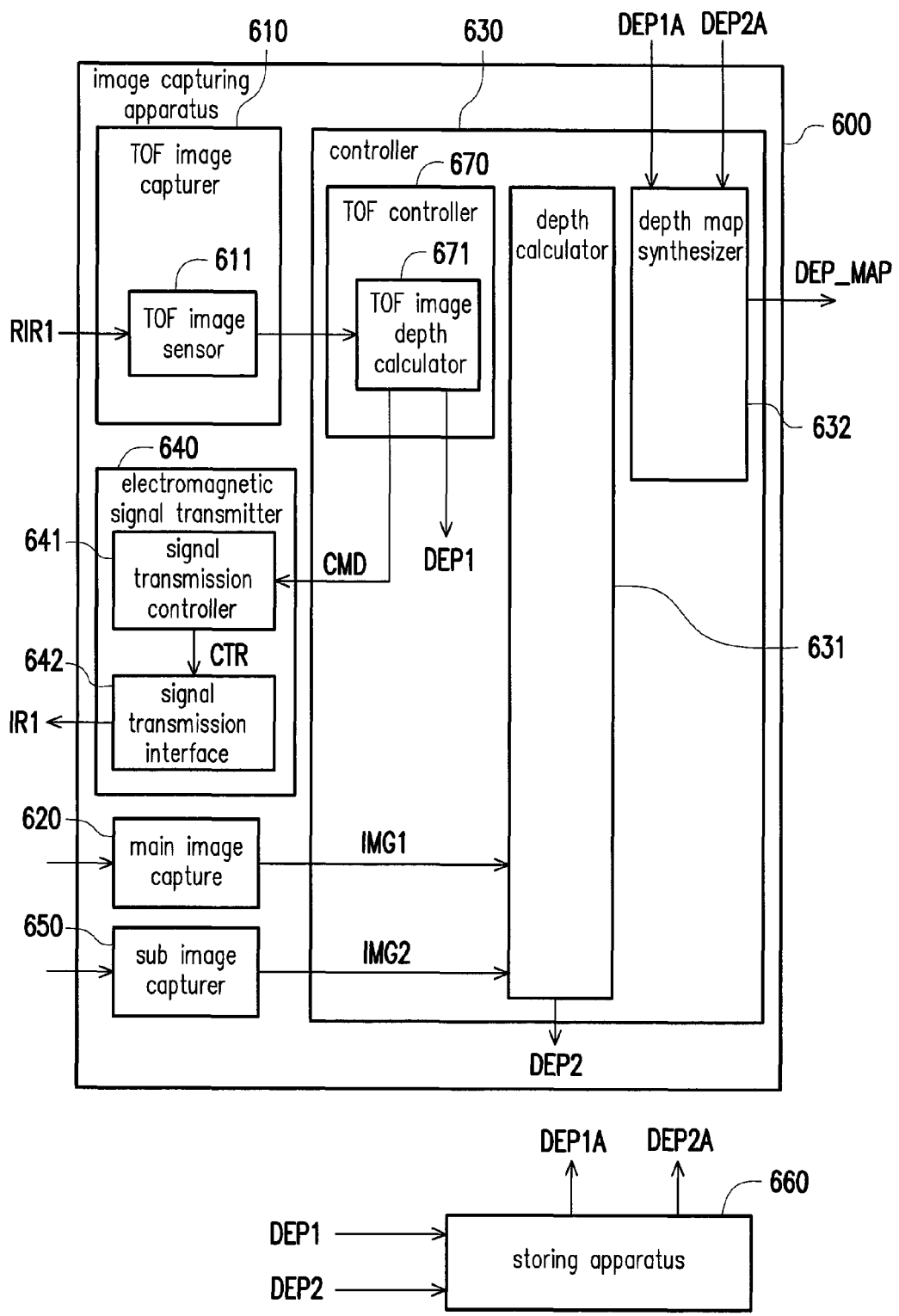
FIG. 6 is a schematic view illustrating an image capturing apparatus of yet another embodiment of the invention.

With reference to FIG. 6, FIG. 6 is a schematic view illustrating an image capturing apparatus of yet another embodiment of the invention. An image capturing apparatus 600 includes a TOF image capturer 610, a main image capturer 620, a controller 630, an electromagnetic signal transmitter 640, a TOF controller 670, and a storing apparatus 660. In the present embodiment, the TOF image capturer 610 includes a TOF image sensor 611. The TOF controller 670 includes a TOF image depth calculator 671. The TOF image sensor 611 is coupled to the TOF image depth calculator 671. The TOF image sensor 611 receives the reflective electromagnetic wave signal RIR1. The TOF controller 670 generates the TOF image TIMG according to the reflective electromagnetic wave signal RIR1, and generates the first depth information set DEP1 of the effective region according to the TOF image TIMG.

The electromagnetic signal transmitter 640 includes a signal transmission controller 641 and a signal transmission interface 642. The signal transmission controller 641 is coupled to the TOF image capturer 610 and receives the transmission command CMD. The signal transmission controller 641 generates a control signal CTR according to the transmission command CMD, and transmits the control signal CTR to the signal transmission interface 642, so as to drive the signal transmission interface 642 to transmit the electromagnetic wave signal IR1.

In the present embodiment, the electromagnetic wave signal IR1 may be an infrared light signal. The signal transmission interface 642 may be an infrared light transmitter, and the signal transmission controller 641 may be a driving circuit of the infrared light transmitter.

The controller 630 includes a depth calculator 631, a depth map synthesizer 632, and a TOF controller 670. The depth calculator 631 receives the images IMG1 and IMG2, and calculates the second depth information set DEP2 of the un-effective region.

It is worthy to note that the storing apparatus 660 is further arranged in the present embodiment so as to store the calculated first and second depth information DEP1 and DEP2. A depth map synthesizer 632 may read a depth information DEP1A (corresponding to the depth information DEP1) and DEP2A (corresponding to the depth information DEP2) from the storing apparatus 660 in order for synthesizing, and accordingly generate the overall depth map DEP_MAP.

Figure 7:
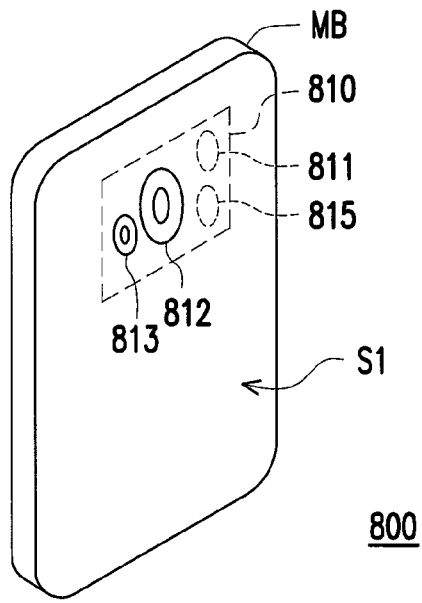
FIG. 7 is a schematic view illustrating a hand-held electronic apparatus of an embodiment of the invention.

With reference to FIG. 7, FIG. 7 is a schematic view illustrating a hand-held electronic apparatus of an embodiment of the invention. The handheld electronic apparatus 800 includes a mainframe MB and an image capturing apparatus 810. An image capturing apparatus 810 includes an electromagnetic signal transmitter 811, a TOF image sensor 815, a main image capturer 812, and a sub image capturer 813. A TOF image capturer is composed of an electromagnetic signal transmitter 811 and a TOF image sensor 815, wherein the TOF image capturer, the main image capturer 812, and the sub image capturer 813 are disposed on a surface S1 of the mainframe MB of the hand-held electronic apparatus 800.

Related implementing details with respect to a method for the image capturing apparatus 810 to obtain outputted image map information have been described in detail in the previous multiple embodiments, and will not be iterated again herein.

Figure 8:
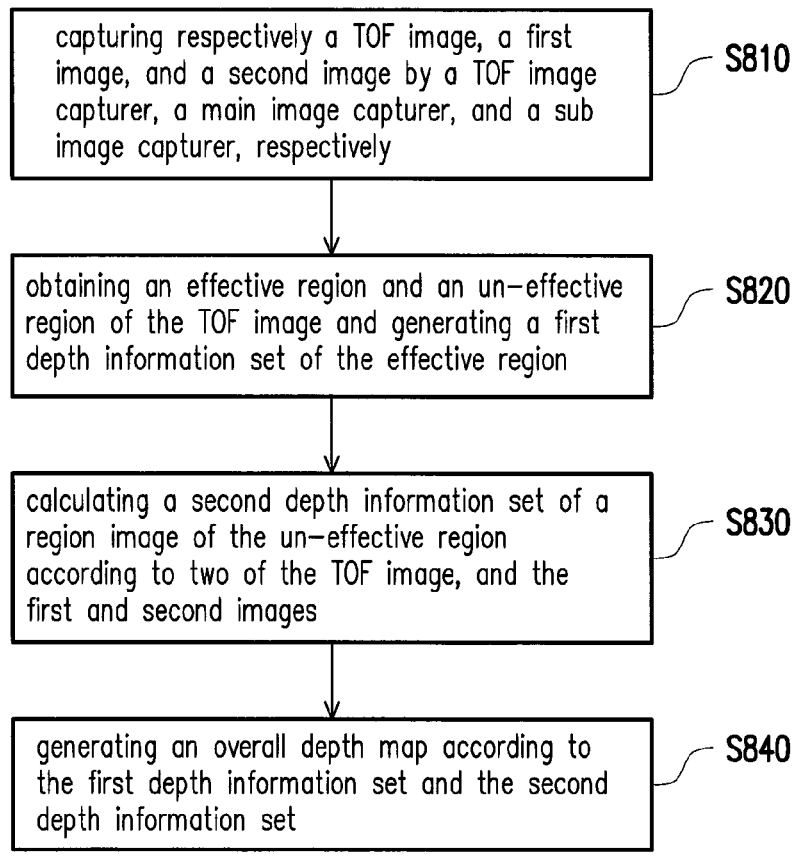
FIG. 8 is a flow chart illustrating a method for obtaining depth information of an embodiment of the invention.

With reference to FIG. 8, FIG. 8 is a flow chart illustrating a method for obtaining depth information of an embodiment of the invention. Steps thereof includes: in Step S810, capturing respectively a TOF image, a first image, and a second image by a TOF image capturer, a main image capturer, and a sub image capturer, respectively; and, in Step S820, obtaining an effective region and an un-effective region of the TOF image and generating a first depth information set of the effective region; next, in Step S830, calculating a second depth information set of a region image of the un-effective region according to two of the TOF image, and the first and second images; and in Step S840, generating an overall depth map according to the first depth information set and the second depth information set.

Implementing details of each step in the present embodiment have been described in detail in the previous multiple embodiments, and will not be iterated again herein.

In view of the above, the overall depth map of the invention is obtained by combining the TOF image capturer and the main and sub image capturers, and by calculating depth information from objects having different object distances in the images, respectively. Therefore, a more complete and accurate overall depth map may be obtained, which effectively enhances quality of an image.

What is claimed is:

1. An image capturing apparatus, comprising:
a time of fly (TOF) image capturer configured for executing an image capturing action and outputting a TOF image;
a TOF controller coupled to the TOF image capturer and calculating a TOF depth map according to the TOF image, defining an effective region and an un-effective region according to the TOF depth map, and capturing a first depth information set corresponding to the effective region from the TOF image, wherein the TOF controller defines a region, in the TOF image, is the effective region or the un-effective region according to an object distance of an object in the region;
a main image capturer configured for executing an image capturing action and obtaining a first image;
a sub image capturer configured for executing an image capturing action and obtaining a second image; and
a controller coupled to the TOF image capturer and the main image capturer, and configured for:
obtaining a second depth information set corresponding to the un-effective region by comparing the first image and an image of the second image in the un-effective region; and
generating an overall depth map by combining the first depth information set and the second depth information set.

2. The image capturing apparatus as claimed in claim 1, wherein the TOF image capturer comprises:
an electromagnetic signal transmitter for transmitting an electromagnetic wave signal,
wherein the electromagnetic wave signal is reflected by an object to generate a reflective electromagnetic wave signal, the reflective electromagnetic wave signal is received by the TOF image capturer and a flying time of the reflective electromagnetic wave signal is calculated to obtain the TOF image.

3. The image capturing apparatus as claimed in claim 2, wherein the TOF controller is configured for determining:
in the TOF image, the region in which the object belongs as the un-effective region when the object distance from the object to the TOF image capturer is longer than a threshold value, the region in which the object belongs as the effective region when the object distance from the object to the TOF image capturer is not longer than the threshold value.

4. The image capturing apparatus as claimed in claim 2, wherein the TOF image capturer comprises:
a TOF image sensor for receiving and obtaining the TOF image by calculating the flying time of the reflective electromagnetic wave signal;
the TOF controller, comprising:
a TOF image depth calculator coupled to the TOF image sensor, obtaining the effective region and the un-effective region of the TOF image, and generating the first depth information of the effective region.

5. The image capturing apparatus as claimed in claim 4, wherein the electromagnetic signal transmitter comprises:
a signal transmission interface configured for transmitting the electromagnetic wave signal according to a control signal; and
a signal transmission controller coupled to the TOF image depth calculator, the signal transmission controller receiving a transmission command from the TOF image depth calculator and generating the control signal according to the transmission command so as to drive the signal transmission interface to transmit the electromagnetic wave signal.

6. The image capturing apparatus as claimed in claim 1, wherein the controller comprises:
a depth calculator calculating the second depth information set of a region image of the un-effective region; and
a depth map synthesizer receiving the first depth information set and the second depth information set, and generating the overall depth map by synthesizing the first depth information set and the second depth information set.

7. The image capturing apparatus as claimed in claim 1, further comprising:
a storing apparatus coupled to the controller and the TOF controller, and configured for storing the first depth information set and the second depth information set.

8. The image capturing apparatus as claimed in claim 1, wherein the main image capturer captures an image according to at least one focal length to obtain the first image, the sub image capturer captures an image according to the at least one focal length to obtain the second image, the controller generates one or more of the second depth information set corresponding to the at least one focal length.

9. The image capturing apparatus as claimed in claim 8, wherein the at least one focal length is setup according to the un-effective region.

10. The image capturing apparatus as claimed in claim 1, wherein the TOF controller and the TOF image capturer are integrated in an integrated circuit (IC), or the TOF controller is built-in the controller.

11. An image capturing apparatus, comprising:
a time of fly (TOF) image capturer configured for executing an image capturing action and outputting a TOF image;

a TOF controller coupled to the TOF image capturer and calculating a TOF depth map according to the TOF image, defining an effective region and an un-effective region according to the TOF depth map, and capturing a first depth information set corresponding to the effective region from the TOF image, wherein the TOF controller defines a region, in the TOF image, is the effective region or the un-effective region according to an object distance of an object in the region;

a main image capturer configured for executing an image capturing action and obtaining a first image; and a controller coupled to the TOF image capturer and the main image capturer, and configured for:

obtaining a second depth information set corresponding to the un-effective region by comparing the first image and an image of the TOF image in the un-effective region; and generating an overall depth map by combining the first depth information set and the second depth information set.

12. A hand-held electronic apparatus, comprising:

a mainframe; and an image capturing apparatus disposed in the mainframe, comprising:

a time of fly (TOF) image capturer configured for executing an image capturing action and outputting a TOF image;

a TOF controller coupled to the TOF image capturer and calculating a TOF depth map according to the TOF image, defining an effective region and an un-effective region according to the TOF depth map, and capturing a first depth information set corresponding to the effective region from the TOF image, wherein the TOF controller defines a region, in the TOF image, is the effective region or the un-effective region according to an object distance of an object in the region;

a main image capturer configured for executing an image capturing action and obtaining a first image;

a sub image capturer configured for executing an image capturing action and obtaining a second image; and a controller coupled to the TOF image capturer and the main image capturer, and configured for:

obtaining a second depth information set corresponding to the un-effective region by comparing the first image and an image of the second image in the un-effective region; and generating an overall depth map by combining the first depth information set and the second depth information set.

13. The hand-held electronic apparatus as claimed in claim 12, wherein the TOF image capturer comprises:

an electromagnetic signal transmitter disposed in the mainframe and configured for transmitting an electromagnetic wave signal, wherein the electromagnetic wave signal is reflected by an object to generate a reflective electromagnetic wave signal, the reflective electromagnetic wave signal is received by the TOF image capturer and a flying time of the reflective electromagnetic wave signal is calculated to obtain the TOF image.

14. The hand-held electronic apparatus as claimed in claim 12, wherein the TOF controller is configured for determining:

in the TOF image, the region in which the object belongs as the un-effective region when the object distance from the object to the TOF image capturer is longer than a threshold value, the region in which the object belongs as the effective region when the object distance from the object to the TOF image capturer is not longer than the threshold value.

15. The hand-held electronic apparatus as claimed in claim 13, wherein the TOF image capturer comprises:

a TOF image sensor disposed on a surface of the mainframe, obtaining the TOF image by receiving and calculating the flying time of the reflective electromagnetic wave signal;

the TOF controller, comprising:

a TOF image depth calculator coupled to the TOF image sensor, obtaining the effective region and the un-effective region of the TOF image, and generating the first depth information of the effective region.

16. The hand-held apparatus as claimed in claim 15, wherein the electromagnetic signal transmitter comprises:

a signal transmission interface disposed on the surface of the mainframe, and configured for transmitting the electromagnetic wave signal according to a control signal; and a signal transmission controller coupled to the TOF image depth calculator, the signal transmission controller receiving a transmission command from the TOF image depth calculator and generating the control signal according to the transmission command so as to drive the signal transmission interface to transmit the electromagnetic wave signal.

17. The hand-held electronic apparatus as claimed in claim 12, wherein the controller comprises:

a depth calculator coupled to the main image capturer, calculating the second depth information set of a region image of the un-effective region according to the first and second images; and a depth map synthesizer receiving the first depth information set and the second depth information set, and generating the overall depth map by synthesizing the first depth information set and the second depth information set.

18. The hand-held electronic apparatus as claimed in claim 12, further comprising:

a storing apparatus coupled to the controller and the TOF controller, and configured for storing the first depth information set and the second depth information set.

19. The hand-held apparatus as claimed in claim 12, wherein the main image capturer captures an image according to at least one focal length to obtain at least one first zooming image, the sub image capturer captures an image according to the at least one focal length to obtain at least one second zooming image, the controller generates one or more of the second depth information set corresponding to the at least one focal length according to the at least one first and second zooming images.

20. The hand-held apparatus as claimed in claim 19, wherein the at least one focal length is setup according to the un-effective region.

21. A method for obtaining depth information, comprising:

capturing respectively a TOF image, a first image, and a second image by a TOF image capturer, a main image capturer, and a sub image capturer, respectively;

obtaining an effective region and an un-effective region of the TOF image, and generating a first depth information set of the effective region, wherein a region in the TOF image is the effective region or the un-effective region is defined according to an object distance of an object in the region;

calculating a second depth information set of a region image of the un-effective region according to two of the TOF image, the first and second images; and generating an overall depth map according to the first depth information set and the second depth information set.

22. The method for obtaining depth information as claimed in claim 21, wherein steps for capturing the TOF image by the TOF image capturer comprise:

transmitting an electromagnetic wave signal, wherein the electromagnetic wave signal is reflected by an object to generate a reflective electromagnetic wave signal;

obtaining the TOF image by receiving the reflective electromagnetic wave signal and calculating a flying time of the reflective electromagnetic wave signal.

23. The method for obtaining depth information as claimed in claim 22, wherein steps for transmitting the electromagnetic wave signal comprise:

receiving a transmission command from the TOF image depth calculator;

generating a control signal according to the transmission command to drive a signal transmission interface to transmit the electromagnetic wave signal.

24. The method for obtaining depth information as claimed in claim 21, wherein steps for obtaining the effective region and the un-effective region of the TOF image comprise:

the region in which the object belongs being the un-effective region when the object distance from the object to the TOF image capturer is longer than a threshold value; and the region in which the object belongs being the effective region when the object distance from the object to the TOF image capturer is not longer than the threshold value.

25. The method for obtaining depth information as claimed in claim 21, wherein a step for generating the overall depth map according to the first depth information set and the second depth information set comprises:

generating the overall depth map by synthesizing the first depth information set and the second depth information set.

26. The method for obtaining depth information as claimed in claim 21, further comprising:

storing the first depth information set and the second depth information set to a memory device.

27. The method for obtaining depth information as claimed in claim 21, further comprising:

obtaining the first image by executing an image capturing action according to at least one focal length;

obtaining the second image by executing an image capturing action according to the at least one focal length; and generating one or more of the second depth information set corresponding to the at least one focal length according to the first and second images.

28. The method for obtaining depth information as claimed in claim 27, wherein the at least one focal length is setup according to the un-effective region.

* * * * *